United States Patent [19]

Stewart

[11] Patent Number: 5,114,633
[45] Date of Patent: May 19, 1992

[54] METHOD FOR THE RESIN-IMPREGNATION OF FIBERS

[75] Inventor: Steven L. Stewart, Houston, Tex.

[73] Assignee: Shell Oil Company, Houston, Tex.

[21] Appl. No.: 700,825

[22] Filed: May 16, 1991

[51] Int. Cl.$^5$ .............................................. B29C 47/04
[52] U.S. Cl. ........................ 264/23; 264/171; 264/174; 156/73.2; 156/180
[58] Field of Search ............... 156/180, 181, 182, 441, 156/436, 379.6, 73.1, 73.2; 425/114, 115, 120, 129.1, 130, 131.1, 543, 544, 174.2; 264/22, 23, 134, 135, 136, 137, 171, 172, 174, 176.1, 177.13, 177.16, 177.17, 177.18, 177.2, 183, 240, 257, 258

[56] References Cited

U.S. PATENT DOCUMENTS

| | | | |
|---|---|---|---|
| 2,408,627 | 10/1946 | Green | 425/456 |
| 3,169,589 | 2/1965 | Bodine, Jr. | 174/58 |
| 3,233,012 | 2/1966 | Bodine, Jr. | 264/23 |
| 3,456,295 | 7/1969 | Torigai | 425/113 |
| 3,523,147 | 8/1970 | Hold et al. | 264/23 |
| 3,608,178 | 9/1971 | Kartiuke et al. | 264/23 |
| 3,702,356 | 11/1972 | Hall | 264/174 |
| 3,737,261 | 6/1973 | Hardesty | 425/113 |
| 3,926,541 | 12/1975 | Hewitt | 425/64 |
| 4,017,237 | 4/1977 | Webster | 425/174.2 |
| 4,050,867 | 9/1977 | Ferrentino et al. | 425/114 |
| 4,289,465 | 9/1981 | Killmeyer et al. | 425/111 |
| 4,394,338 | 7/1983 | Fuwa | 264/135 |
| 4,434,121 | 2/1984 | Schüper | 264/174 |
| 4,439,387 | 3/1984 | Hawley | 264/108 |
| 4,498,941 | 2/1985 | Goldsworthy | 156/148 |
| 4,500,280 | 2/1985 | Astier et al. | 425/569 |
| 4,525,131 | 6/1985 | Hauser, Jr. | 425/114 |
| 4,551,289 | 11/1985 | Schwab et al. | 264/23 |
| 4,571,086 | 2/1986 | Wooten et al. | 366/127 |
| 4,678,420 | 7/1987 | Inoue | 425/144 |
| 4,735,992 | 5/1988 | Nogues | 525/64 |
| 4,793,954 | 12/1988 | Lee et al. | 264/23 |
| 4,812,343 | 3/1989 | Klekhaefer et al. | 428/35.6 |
| 4,818,464 | 4/1989 | Lau | 264/510 |

OTHER PUBLICATIONS

H. Ishida & G. Rotter, RIM-Pultrusion of Thermoplastic Matrix Composites, 43rd Annual Conf., Composite Institute, Feb. 1988, pp. 1-2.

Primary Examiner—Jay H. Woo
Assistant Examiner—Jeremiah F. Durkin, II

[57] ABSTRACT

A process is disclosed wherein two co-reactive resin streams are mixed immediately adjacent the entrance of an impregnation die used to make products by the pultrusion process. The mixing occurs immediately adjacent the fibers as they are pulled into the central duct opening of the die. The resin streams are delivered to the entrance of the impregnation die by use of a resin feed head positioned at the inlet of the impregnation die. An ultrasonic driver coupled to the resin feed head vibrates and agitates the resin streams impinging the fibers so as to thoroughly wet the fiber bundle prior to its passage through the die.

7 Claims, 3 Drawing Sheets

METHOD FOR THE RESIN-IMPREGNATION OF FIBERS

RELATED APPLICATION

The present invention is related to copending application Ser. No. 07/700,824, filed May 16, 1991, entitled "Apparatus for the Resin-Impregnation of Fibers," same inventor.

BACKGROUND OF THE INVENTION

1. Field of the Invention

The current invention is directed to the mixture of two reactive resin streams within the entrance of a pultrusion die. The resin streams are mixed adjacent fibers being pultruded through the die, the resin streams wetting the fibers. An ultrasonic driver agitates the resins and fibers to accelerate the rate of fiber wettability.

2. Description of the Prior Art

As noted in U.S. Pat. No. 4,793,954, an ultrasonic driver may be used to improve thermoplastic extrusion or injection rates. The ultrasonic vibration from the driver desirably is applied to the extrusion or injection die in a direction parallel to the flow of the thermoplastic material.

In U.S. Pat. No. 4,500,280 a vibrating feed device is placed between an injection head and a mold. The device vibrates the thermoplastic molding material that flows from the injection head into the mold. This vibration improves the flow and distribution of the molding material and the quality of the molded article.

U.S. Pat. No. 3,169,589 also discloses that solid or semi-solid plastic or flowable consolidated materials can be made to extrude, i.e., pass through an orifice or tube, when soundwaves are applied to the materials, or to the extrusion die, or both.

Reference also U.S. Pat. No. 2,408,627 wherein relatively rapid vibrations are imparted to an extrusion apparatus and preferably to the extrusion die by a device such as an electric or electromagnetic vibrator. The rate and amplitude of the vibrations may be adjusted. The invention of the '627 patent relates to the extrusion of non-metallic plastic material.

Ultrasonic vibrations may also be used to improve the processability of materials other than the thermoplastic materials noted in the above patents. Reference, for example, the vibration apparatus of U.S. Pat. No. 3,456,295 used to coat welding rods with welding flux, wherein the apparatus is operated in the range from about 5,000 to about 400,000 cycles per second.

In U.S. Pat. No. 3,737,261 sonic drivers are used to help saturate fibers with an already-mixed thermoset resin.

Let us now consider the reaction injection molding (RIM) process.

As noted in the article "RIM-pultrusion of Thermoplastic Matrix Composites", authored by Mr. H. Ishida and Mr. G. Rotter, presented Feb. 1 through May 1988 at the 43rd Annual Conference of the Composites Institute, RIM denotes a process in which two low viscosity polymer precursors are brought together in an impingment mixer (FIG. 1) where they begin to react, before traveling on to fill a mold. The low viscosity of the resins reduces the pumping requirements and leads to better resin penetration of the mold and reinforcement. RIM is limited, however, in that it is generally a batch operation and is at a cost disadvantage with continuous processes. Furthermore, it is difficult to produce RIM parts with continuous fiber reinforcement.

The continuous fiber-reinforcement pultrusion process (FIG. 2) combines catalyzed resin and fiber reinforcement in a resin tank prior to the resin-soaked fiber being pulled through a heated die by pullers and thereafter cut to a particular length. Generally, the resin tank contains mixed thermosetting resins which undergo some degree of cure in the tank over time. The viscosity of the resins in the tank thereafter increases over time. If the mixed resins thicken sufficiently the machine will stall.

These factors have generally limited the pultrusion process to blended resin materials with relatively long pot lives.

In the above publication, Mr. Ishida and Mr. Rotter suggest that the resin tank be replaced by the resin impregnation chamber as shown in FIG. 3. It is in this chamber that the wet-out of the reinforcement occurs. The authors suggest that the limitations of each individual technique have been avoided such that the pot life restrictions of the resin tank are drastically reduced by the use of materials with short gel times and low viscosities. The authors suggest that many resin chemistries previously unavailable for pultrusion can now be used. The process is equally applicable to thermoset RIM systems as demonstrated by the production of urethane pultrusions.

One resin system for this suggested pultrusion process is disclosed in U.S. Pat. No. 4,735,992, wherein a pre-mixed blend of reactive resin streams feeds a die having a glass fiber core continuously pulled therethrough, as noted in column 3, line 57 through column 4, line 8 of this '992 patent. Note that, once again, the resin is pre-mixed prior to saturation of the glass fiber core.

Mr. Ishida et al. suggest in FIG. 4 a possible resin chamber design wherein already mixed resin components are introduced from above to wet fibers entering the chamber at an angle. A nitrogen blanket may be provided if needed, for sensitive RIM chemistries.

For initial studies, Ishida adopted the more basic design shown in FIG. 5A. This chamber still has the hydrostatic squeezing advantage of the FIG. 4 design, but now has dead zones along its length. It can be expected that in these dead zone areas the resin will stagnate and cure prematurely, possibly even leading to the formation of a resin plug (FIG. 5B) which would stall the machine. The resin could also cure to possibly form a sheet or funnel about the inner diameter of the wall, so subsequent material would flow more easily, as shown in FIG. 6.

All of these problems of course originate from the pre-mixing of the two co-reactive resin streams earlier than absolutely necessary. A process needs to be developed wherein the co-reactive resin streams are mixed together at the last possible moment. The process must include some compensatory device to increase fiber wet out, at the point of saturation, since there no longer exists in the process a large resin tank for wetting the fibers, nor a resin chamber fed with pre-mixed resin.

SUMMARY OF THE INVENTION

The method of the present invention moves the mixing of the co-reactive resin streams into the immediate entrance to the impregnation die, and compensates for the shortness of the resin/fiber soak time by use of an ultrasonic driver positioned to agitate or vibrate the resin quickly into the fibers. The resin is not pre-mixed several inches or several feet upstream of the heated die, but is mixed at the immediate entrance to the die. Resins having extremely short reactivity times may therefore be used, without worry of system plugging.

The impregnation die has a tapered opening which converges inwardly and intersects a central duct opening defined through the die. A separate resin feed head is cooperatively positioned within the tapered opening. The fiber reinforcement material is drawn between the resin feed head and through the central duct opening.

The resin feed head has a mixing face which is positioned adjacent the central duct opening. Flow openings included within the resin feed head deliver and direct two separate co-reactive resin streams to the mixing face. The resin streams mix together adjacent the mixing face and/or in the fiber reinforcement material as the material passes by the mixing face. An ultrasonic driver is coupled to the resin feed head and vibrates the head so as to speed the rate of resin/fiber wetout.

In operation the fibrous material is drawn between the resin feed head and the tapered surface of the impregnation die and thereafter fed it into the central duct opening. The ultrasonic driver means coupled to the resin feed head is thereafter energized. Two separate resin streams thereafter flow through openings in the resin feed head and discharge from separate flow openings in the mixing face of the feed head, the mixed resin streams impregnating the fibrous material located adjacent the mixing face. The resin impregnated fibrous material is thereafter drawn away from the mixing face before the mixed resin saturating the fiber hardens.

It is a feature of the invention to include an ultrasonic driver operatively coupled to the resin feed head so as to vibrate the resin feed head relative to the impregnation die and thereby accelerate the whetting of the resin discharged from the resin feed head into the fibrous material.

It is an object of this invention to describe a continuous RIM/pultrusion process wherein the co-reactive resin streams are mixed immediately adjacent the fibrous material being drawn through the impregnation die.

These and other features, objects and advantages of the present invention will become apparent from the following detailed description, wherein reference is made to the Figures in the accompanying drawings.

IN THE DRAWINGS

DESCRIPTION OF THE PREFERRED EMBODIMENT

Referring now to prior art FIGS. 1-6, FIG. 1 shows a typical reaction injection molding apparatus wherein two separate co-reactive resins held in tank A 11 and Tank B 12, separately, thereafter are mixed at mix head 14 prior to their infusion in mold 16.

Figure 2:
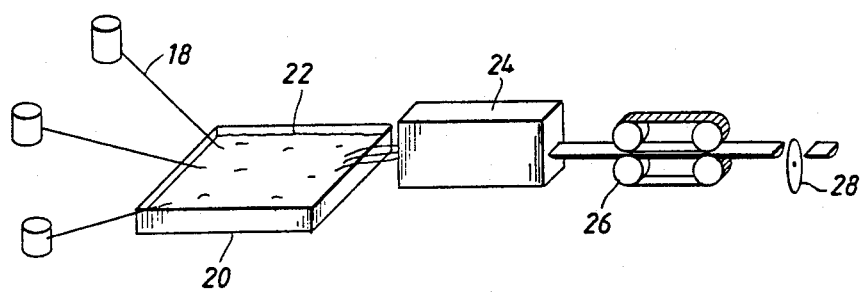
FIG. 2 is a pictorial diagrammatic representation of a typical pultrusion process.

Elements of the pultrusion process are represented in FIG. 2. Fibers 18 are feed through resin tank 20 containing pre-mixed resin 22, before the fibers are drawn through heated die 24 by pullers 26, prior to being cut to specific lengths by saw 28.

Figure 1:
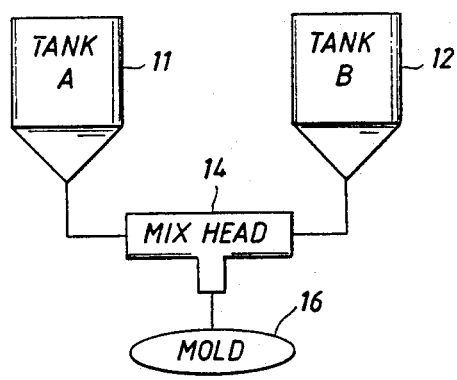
FIG. 1 is a pictorial diagrammatic view of a typical reaction injection molding process.
Figure 3:
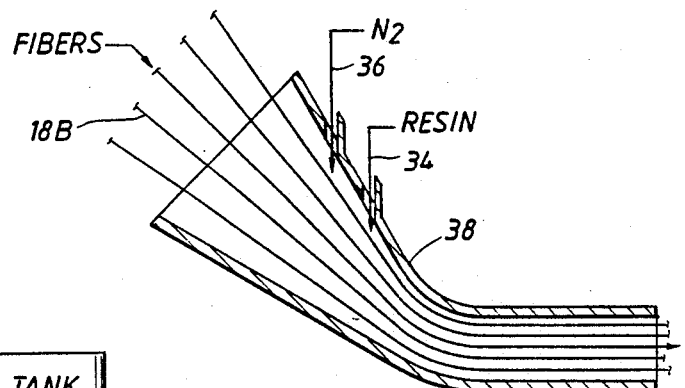
FIG. 3 is a pictorial diagrammatic view of a typical RIM-pultrusion process.

The RIM-pultrusion equipment shown in FIG. 3 is a combination of the equipment shown in the two previous FIGS. 1 and 2. A resin held in tank A 11A and a resin held in tank B 12B are combined in mix head 14A and thereafter injected into resin chamber 30, to saturate the fibers 18A. The fibers are drawn through heated die 24A by pullers 26A and thereafter cut by saw 28A. The resin-whetted fiber bundle 32 exiting resin chamber 30 is exposed to atmospheric conditions, and the resin incorporated in the fibers must have a sufficient cure time such that the fibers/resin structure does not bind within the heated die 24A.

Figure 4:
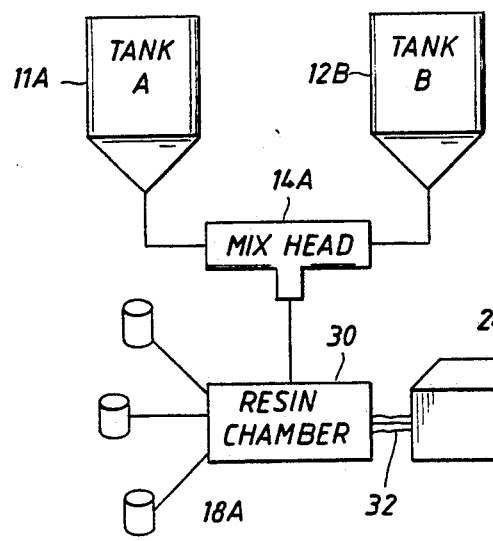
FIG. 4 shows a schematic representation in a side view and cross section of fibrous material being saturated by an already-mixed resin system.

Another way of combining the already mixed resin 34 with the fibers 18B is shown in FIG. 4 wherein the fibers remain spaced apart sufficiently for the resin to flow around and into the fibers prior to the fiber/resin mixture being pulled through wetting die 38. A source of nitrogen 36 may be supplied at the entrance to the wetting die 38.

Figure 5A:
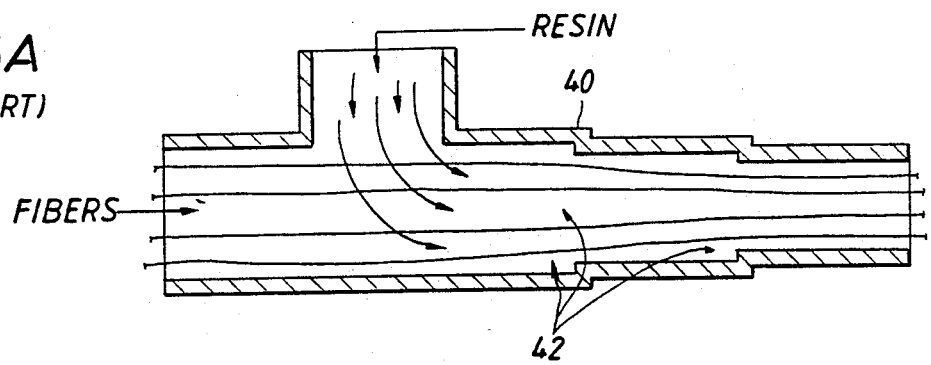
FIG. 5A shows a schematic representation in cross section of fibrous material being impregnated with resin in a resin chamber.
Figure 5B:
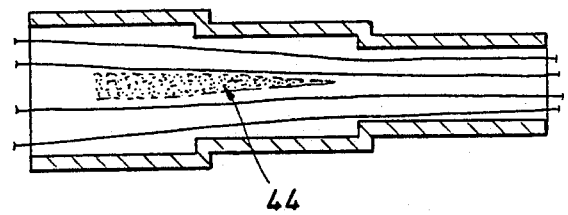
FIG. 5B shows a schematic representation in a side view and cross section of the resin chamber plugged with a wedge of hardened resin.
Figure 6:
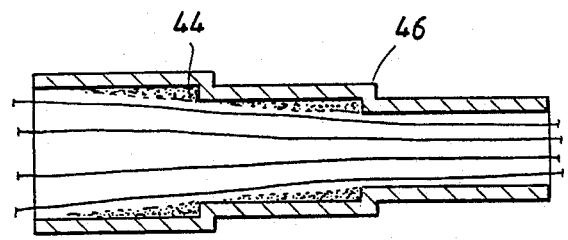
FIG. 6 shows a schematic representation in a side view and partial cross section of hardened resin formed about the inner walls of a resin chamber.

Referring now to FIG. 5A a wetting die 40 can be seen to include dead zones 42 where excess resin may tend to accumulate and harden. As shown in FIG. 5B a plug 44 of hardened resin may be formed in the central dead zone 42 and thereafter stall the fiber drawing process. As shown in FIG. 6 the hardened resin plug 44 may form adjacent the wall 46 and either aid the fibers in passage past the sharp edges of the wall 46, or continue to build up and eventually cause the process to stall.

Figure 9:
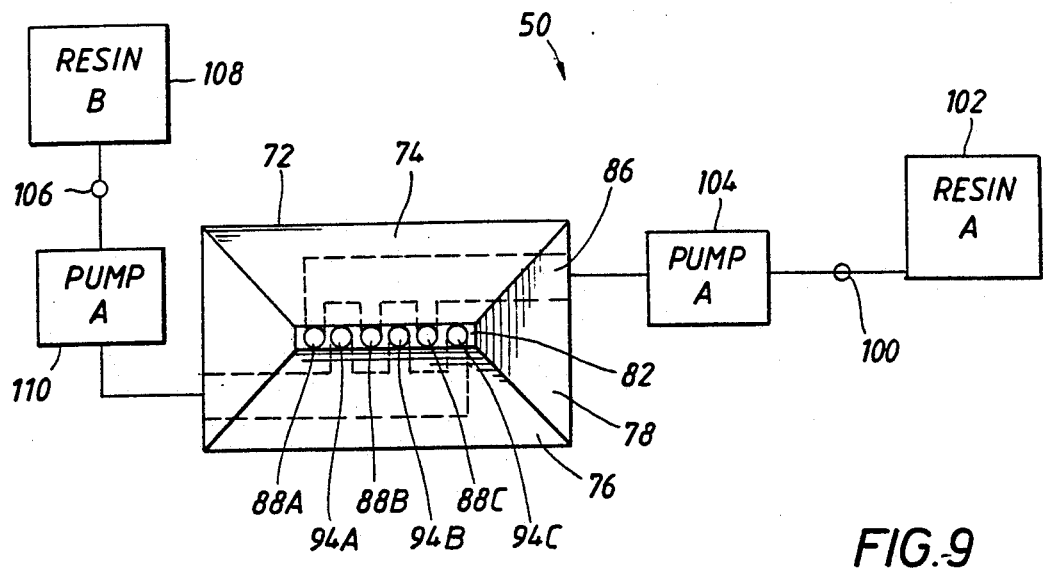
FIG. 9 shows a schematic representation in a front view of the resin feed head.
Figure 7:
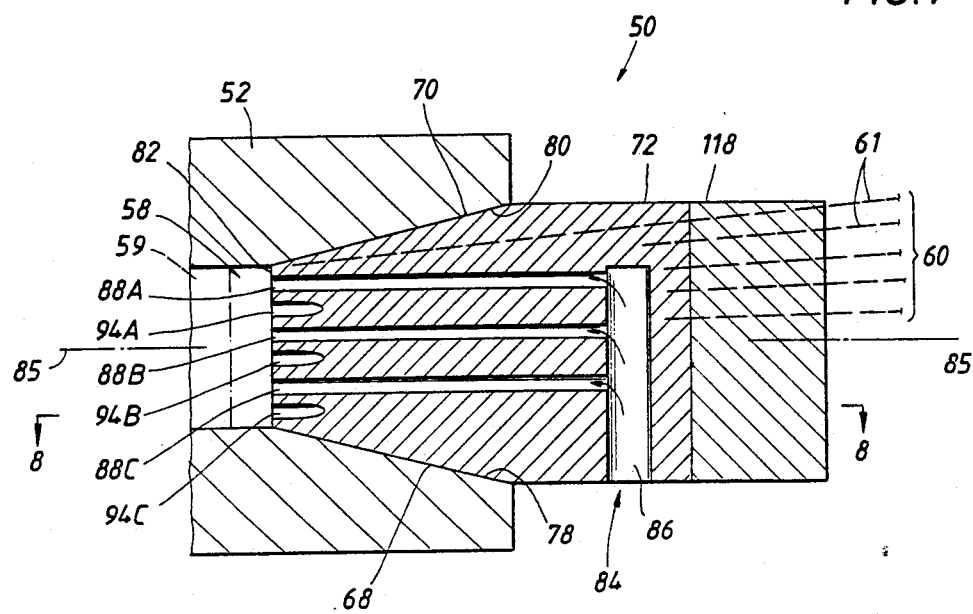
FIG. 7 shows a schematic representation in a top view in cross section of a resin feed head inserted into an impregnation die.
Figure 8:
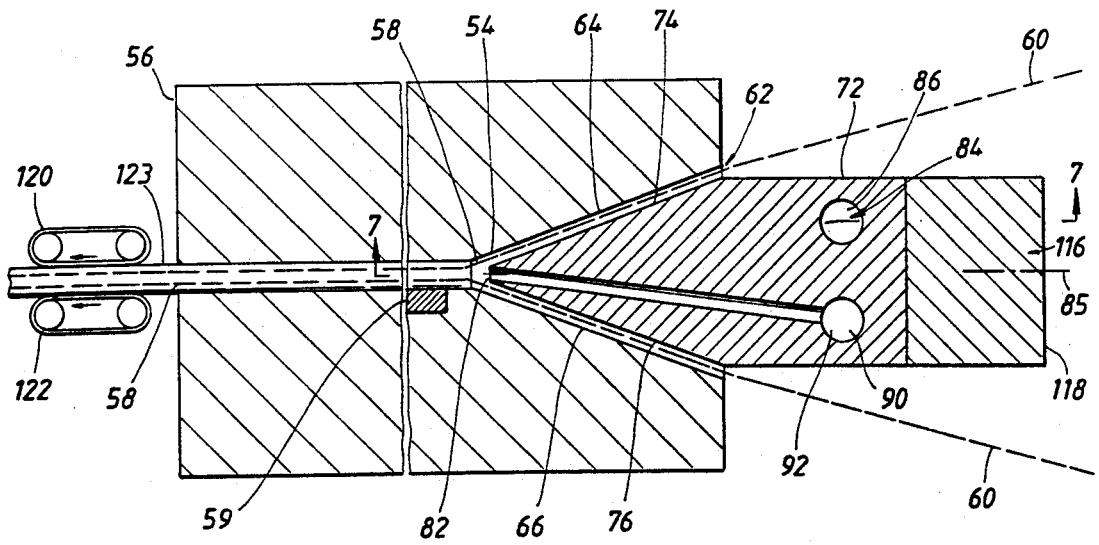
FIG. 8 shows a schematic representation in a side view in cross section of the resin feed head inserted within the impregnation die.

Referring now to FIGS. 7, 8 and 9 an apparatus 50 is shown which overcomes the problems of the prior art devices. The apparatus includes an impregnation die 52 having an inlet end 54 and an outlet end 56 and a central duct opening 58 defined between the inlet and outlet end. The central duct opening as is well known in the pultrusion art is sized to draw at least one resin impregnated fiber 60 therethrough. The term fiber 60 should be taken in its generic sense, to include all types of fiber reinforcement commonly used in the fabrication of pultruded fiber reinforced plastic articles. "Fiber" 60 can therefore include a single fiber, a plurality of fibers, continuous strand mat, uni-directional cloth, woven rovings, or any other material used to reinforce hardenable resin systems.

Several fiber approach paths 61 to the central duct opening are shown in FIG. 7, though all of the paths are not shown to preserve the visual clarity of the underlying structure.

The inlet end of the impregnation die can be seen to have a tapered opening 62 (FIG. 8) defined by at least one tapered surface which convergedly intersects the central duct opening 58. In a preferred embodiment, the tapered opening 62 is defined by the impregnation die upper tapered surface 64, the impregnation die lower tapered surface 66, the impregnation die side surface A 68 and the impregnation die side surface B 70. It should be well understood that many other combinations of conical, curvilinear, or straight surfaces may be used to form the tapered opening leading to the central duct opening 58.

The impregnation die may also include at least one heater element 59 that may be used to supply thermal energy to the resin-saturated fiber as is well known to the art.

Apparatus 50 can also be seen to include a resin feed head 72 which is cooperatively positioned within the tapered opening 62. As can be seen in FIG. 8 a portion of the resin feed head is spaced from the impregnation die upper tapered surface 64 and lower tapered surface 66 so as to allow the fiber 60 to be drawn therebetween, and thereafter into the central duct opening 58. Dividing the fibers in this manner prior to their convergence within the central duct opening 58 aids in the resin-impregnation of the fibers, as explained more fully below.

The resin feed head 72 can be seen to include resin feed head upper tapered surface 74, resin feed head lower tapered surface 76, resin feed head side surface A 78, and resin feed head side surface B 80. The resin feed head surfaces 74, 76, 78, 80, of course, may be shaped in any manner to allow the resin feed head to fit within tapered opening 62. In a preferred embodiment, the side surfaces 78, 80 are sized to operatively engage the cooperating surfaces 68, 70 of the impregnation die, since no fibers 60 need be drawn past the side surfaces of the resin feed head and impregnation die. Sealing the side surfaces with one another can also stabilizes the resin feed head 72 relative to the impregnation die. Side surfaces may include any elastomeric sealing means well known to the art to accomplish this purpose. In the alternative, the resin feed head side surfaces of course may be spaced from the impregnation die.

The resin feed head 72 can be seen to have a mixing face 82 positioned adjacent the central duct opening. In the preferred embodiment the mixing face 82 is positioned perpendicular to a central longitudinal axis 85 defined axially through the central duct opening and the resin feed head 72. It should be well understood that the mixing face 82 in an alternative embodiment may be positioned on the other tapered surfaces of the resin feed head, or on the tapered surfaces of the impregnation die, so long as the resin discharged from the face mixes and distributes evenly within the fiber 60 being drawn through the impregnation die.

The resin feed head 72 can be seen to have a first resin flow opening means 84 such as a resin A channel 86 which forms a common resin supply header within the resin feed head, and thereafter a distribution network of smaller openings which allow the resin to flow down to the mixing face. The resin A channel 86 ends at the mixing face in resin flow openings 88A, 88B, 88C. These openings for visual clarity all have arrows labeled "A" in FIG. 7, and are simply labeled "A" in FIG. 9.

In a similar manner the resin feed head includes a second resin flow opening means 90 such as resin B channel 92 terminating at the mixing face in resin flow openings 94A, 94B, and 94C. For visual clarity, these openings are shown in FIG. 7 with arrows labeled "B" discharging therefrom, and labeled in FIG. 9 as openings "B". As can be seen the separate resin flow opening means 84, 90 define separate resin flow openings 88A, B, C, and 94A, B, C in the mixing face. In this manner, the resins supplied to the separate resin channels 86, 92 are maintained separate and do not mix until they at least reach the mixing face.

Apparatus 50 can also be seen to include means for flowing a first resin stream 100 (FIG. 9) through said first resin flow opening means, such as by use of resin A holding tank 102 coupled with pump A 104 which discharges into the resin A channel 86. In a similar manner a second resin stream 106 may be pumped from tank 108 by pump B 110 into resin B channel 92. The resin streams 100, 106 thereafter discharge through the separate resin flow openings in the mixing face and mix, the mixed resin streams 106, 100 impregnating the fibers 60 passing thereby.

The first resin stream 100 would discharge through openings 88A, B, C, and the second resin stream 106 would discharge through openings 94A, B, C. Refer for example to FIG. 9.

The resin streams may comprise components normally used in the reaction injection molding process, or may comprise any other resin system wherein the resin streams are co-reactive and hardenable with each other when mixed together. In one preferred embodiment of the invention, the first resin stream 100 may be selected to be a polyisocyanate, containing an average of two or more reactive isocyanate groups per molecule, and the second stream 106 may be selected to be a polyol or polyamine, capable of reacting with the polyisocyanate, containing an average of two or more reactive hydroxyl or amine groups per molecule.

Either or both resin streams may contain a reaction catalyst, capable of modifying the reaction rate or reaction path of the combined resin streams.

These resins constitute what is known in the industry as a polyurethane system, so-called because of the urethane linkages formed during the curing reactions. Chemically similiar resins are the polycarbamates and polyisocyanurates. A typical resin of this type is Dow Chemical Company's SPECTRIM MM 310, a polycarbamate system consisting of; SPECTRIM MM 310-A, a polyisocyanurate resin; SPECTRIM MM 310-B, a polyol resin; and SPECTRIM MM 310-C, a reaction catalyst (typically added to the polyol at 0.10% by weight).

The choice of the resin systems will vary depending on the size and shape of the part to be formed, as well as the chemical and mechanical properties required in the application of the final part. The polyurethanes, polycarbamates, and the polyisocyanurates provide fast reactions and thus high production rates, but with lower stiffness and other mechanical properties than the polyester and epoxy resins. The polyester and epoxy resins generally provide higher mechanical properties but are generally slower reacting than the polyurethanes, polycarbamates, and polyisocyanurates.

It should be well understood that many other reactive resin systems may be used to accomplish the same result.

The apparatus 50 can also be seen to include an ultrasonic driver means 116 such as an ultrasonic driver device 118 operatively coupled to the resin feed head and being capable of vibrating the resin feed head. In a preferred embodiment the ultrasonic driver would comprise an ultrasonic stephorn such as those available from Branson Sonic Power Company. In a preferred embodiment this ultrasonic driver would vibrate from about 15 kilohertz to about 25 kilohertz.

Use of the ultrasonic driver solves the problem of trying to quickly and thoroughly inject the mixed resin about the fibers as they are being pulled into the central duct opening 58 of the impregnation die. Merely pulling the fiber 60 past a non-vibrating resin feed head would possibly lead to resin dry spots in the fibers 60, with the formation of resin-poor voids in the finished product. Lack of this external vibration supplied by the ultrasonic driver would also not allow the resin streams to mix thoroughly and thereby co-react with one another, causing the final product to contain an uneven distribution of co-reacted resin.

The apparatus 50 can also be seen to include means for drawing the resin impregnated fiber away from the mixing face before the mixed resin saturating the fiber hardens, such as puller A 120 and puller B 122 as in well known to the art.

Referring more specifically now to FIG. 9 it can be seen that the separate resin flow openings may be defined in the mixing face so as to be spaced equally across the length of the mixing face. Additionally, the resin flow openings are defined in a preferred embodiment in an alternating manner across the length of the mixing face. In other words, a resin flow opening discharging resin stream A would be located adjacent a resin flow opening discharging resin B. In a preferred embodiment, the separate resin flow openings are oriented to discharge the resin streams 100, 106 parallel to the central longitudinal axis of the central duct opening, though it should be well understood that this discharge orientation may be varied depending on the location and type of fiber 60 being fed past the resin feed head into the impregnation die, or the type of resin being used.

In operation, the fiber 60 would initially be drawn between the resin feed head and the tapered surface of the impregnation die into the central duct opening. The ultrasonic driver means would thereafter be energized to vibrate the resin feed head. A first resin stream 100 would flow through the first resin flow opening means and a second resin stream 106 would thereafter flow through the second resin flow opening means, the resin streams being co-reactive and hardenable with each other when mixed together. The resin streams would discharge through the separate resin flow openings in the mixing face and thereafter mix, the mixed resin streams impregnating the fibers with mixed resin. The resin impregnated fibers would be drawn away from the mixing face before the mixed resin saturating the fiber hardened.

Depending on the geometries of the mixing face relative to the central duct opening, and the orientation of the fiber relative to the intersection of the mixing face with the central duct opening, the resin streams could mix and react adjacent the mixing face and thereafter impregnate the fiber. Or, the resin streams could mix and react adjacent the mixing face and adjacent the fiber 60 and thereafter impregnate the fiber. Alternatively, the resin streams could mix and react adjacent the fiber and thereafter impregnate the fiber. It is therefore possible to tailor the dynamics of the process such that various resin systems may be used, along with various fiber systems, to produce a pultruded article.

Once the resin is mixed with the fiber the normal pultrusion process parameters for a particular resin system may be used as a guide in establishing the remaining process parameters. For example, the mixed resin would most probably be allowed to harden before the resin impregnated fiber is drawn from the outlet end of the impregnation die. The heater elements may be energized to supply a certain amount of thermal energy to the resin impregnated fiber material as it passes through the impregnation die, as is well known to the art.

Alternatively, one may only partially cure the resin to provide a preimpregnated ("prepreg") product that subsequently is reformed and cured in another molding operation. An example of this would be to pultrude a prepreg I-beam and place this on an uncured prepreg panel followed by a thermal curing cycle to both cure and bond the two articles together (co-curing).

It should be well recognized that other ultrasonic drivers may be located in other locations about the apparatus 50. The ultrasonic driver, along with the mixing action of the resin streams, will provide more uniform impregnation of the reinforcement and assist in air removal from the reinforcement.

An additional benefit of the ultrasonic driver is the ability to include pigments and fillers, both mineral and organic, in the resin system and uniformly distribute these pigments and fillers throughout the fibers without the normal filtration of these solids on the fiber bundle surfaces.

It should be well understood that the resin feed head/impregnation die combination may be used to produce pultrusions having many various cross-sections besides the rectangular pultrusion 123 shown in FIG. 8. Pultrusions having circular cross-sections made be fabricated according to the teachings of this invention, wherein the inner mandrel may comprise the ultrasonically-driven resin delivery apparatus. Multiple ultrasonic drivers/resin feed heads may be used to fabricate complex cross-sections having I, T, J, and S beams and any other combinations thereof.

Many other variations and modifications may be made in the apparatus and techniques hereinbefore described, both by those having experience in this technology, without departing from the concept of the present invention. Accordingly, it should be clearly understood that the apparatus and method depicted in the accompanying drawings and referred to in the foregoing description are illustrative only and are not intended as limitations on the scope of the invention.

I claim as my invention:

1. A method of resin-impregnating a fiber, said method comprising the steps of providing:

an impregnation die having an inlet end and an outlet end and having a central duct opening defined therebetween sized to draw at least one resin-impregnated fiber therethrough, said inlet end of said impregnation die having a tapered opening defined by at least one tapered surface convergedly intersecting said central duct opening, a resin feed head cooperatively positioned within said tapered opening, a portion of said resin feed head spaced from said tapered surface to allow at least one fiber to be drawn therebetween the thereafter into said central duct opening, said resin feed head having a mixing face positioned adjacent said central duct opening, said resin feed head having a first resin flow opening means and a second resin flow opening means defined therethrough, said resin flow opening means defining separate resin flow openings in said mixing face, and ultrasonic driver means operatively coupled to said resin feed head and capable of vibrating said resin feed head, drawing said fiber between said resin feed head and said tapered surface of said impregnation die into said central duct opening, energizing said ultrasonic driver means to vibrate said resin feed head, flowing a first resin stream through said first resin flow opening means and a second resin stream through said second resin flow opening means, said resin streams reacting when mixed together, said resin streams discharging through said separate resin flow openings in said mixing face and thereafter mixing, said mixed resin streams impregnating said at least one fiber with a mixed resin, and drawing said resin impregnated fiber away from said mixing face before said mixed resin saturating said fiber hardens.

2. The method of claim 1 wherein said resin streams mix and react adjacent said mixing face and thereafter impregnate said fiber.

3. The method of claim 1 wherein said resin streams mix and react adjacent said mixing face and adjacent said at least one fiber and thereafter impregnate said fiber.

4. The method of claim 1 wherein the resin streams mix and react adjacent said at least one fiber and thereafter impregnate said fiber.

5. The method of claim 1 including, subsequent to the step of drawing said resin impregnated fiber away from said mixing face before said mixed resin saturating said fiber hardens, the step of hardening said resin in said resin impregnated fiber before said resin impregnated fiber is drawn from said outlet end of said impregnation die.

6. The method of claim 1 wherein the step of energizing said ultrasonic driver includes the step of energizing said ultrasonic driver from about 15 khz to about 25 khz.

7. The method of claim 1 wherein said first resin stream is a polyisocyanate resin, and wherein said second resin stream is a catalyzed polyol resin.

* * * * *